United States Patent
Mayer

(10) Patent No.: US 8,868,358 B2
(45) Date of Patent: Oct. 21, 2014

(54) FILL LEVEL MEASURING DEVICE WORKING WITH MICROWAVES

(75) Inventor: Winfried Mayer, Buch (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 638 days.

(21) Appl. No.: 13/063,004

(22) PCT Filed: Aug. 19, 2009

(86) PCT No.: PCT/EP2009/060731
§ 371 (c)(1),
(2), (4) Date: Mar. 9, 2011

(87) PCT Pub. No.: WO2010/034574
PCT Pub. Date: Apr. 1, 2010

(65) Prior Publication Data
US 2011/0161019 A1    Jun. 30, 2011

(30) Foreign Application Priority Data

Sep. 23, 2008   (DE) .......................... 10 2008 048 582

(51) Int. Cl.
*G01F 17/00*    (2006.01)
*G01F 19/00*    (2006.01)
*G01S 13/08*    (2006.01)

(52) U.S. Cl.
USPC ............................. 702/55; 73/1.73; 342/124

(58) Field of Classification Search
USPC ........................ 702/55, 81, 84, 127, 137, 150, 702/155–159, 166, 172, 189; 324/637, 639, 324/642, 644, 646; 342/124, 127–130; 73/1.73, 1.79, 1.81, 290 R, 291, 293
See application file for complete search history.

(56) References Cited

U.S. PATENT DOCUMENTS

| | | | |
|---|---|---|---|
| 4,258,366 A | 3/1981 | Frosch | |
| 4,962,384 A | 10/1990 | Walker | |
| 2002/0100317 A1* | 8/2002 | Deserno et al. | ............. 73/290 V |
| 2004/0080324 A1 | 4/2004 | Westerling | |

FOREIGN PATENT DOCUMENTS

| | | |
|---|---|---|
| DE | 10040131 A1 | 3/2002 |
| DE | 102006030965 A1 | 1/2008 |
| WO | 2004/005960 A1 | 1/2004 |

OTHER PUBLICATIONS

English translation of the International Prelim. Report

* cited by examiner

*Primary Examiner* — Toan Le
(74) *Attorney, Agent, or Firm* — Bacon & Thomas, PLLC

(57) ABSTRACT

A fill level measuring device includes: a transmitting and receiving system for producing a higher frequency microwave signal and a lower frequency microwave signal. The transmitting and receiving system includes a single antenna, which has an internally funnel shaped horn and two hollow conductor segments connected with one another and connected to the horn. The antenna additionally includes, a coaxial conductor connection, via which the antenna is fed with the lower frequency microwave signal and the associated lower frequency echo signal is received. The antenna additionally includes, connected to a horn-remote end of that one of the two hollow conductor segments arranged on an end of the hollow conductor segment adjoining the horn, a hollow conductor connection, via which the antenna is fed with the higher frequency microwave signal and the associated higher frequency echo signal is received.

16 Claims, 4 Drawing Sheets

FILL LEVEL MEASURING DEVICE WORKING WITH MICROWAVES

TECHNICAL FIELD

The invention relates to a fill level measuring device working according to the travel time principle for measuring fill level of a fill substance in a container. In measurement operation, by means of an antenna, the device transmits microwaves, receives back, following a travel time dependent on the fill level to be measured, echoes of the microwaves reflected from the surface of the fill substance, and, on the basis of travel time, determines fill level.

BACKGROUND DISCUSSION

Such contactlessly working measuring devices are applied in a large number of branches of industry, e.g. in the processing industry, in the chemicals industry or in the foods industry.

Typically, the fill level measuring device is mounted above the fill substance and the antenna of the device is directed toward the fill substance.

For determining travel time, all known methods can be applied, which enable relatively short distances to be measured by means of reflected microwaves. Best known examples are pulse radar and frequency modulation continuous wave radar (FMCW radar).

In the case of pulse radar, short microwave transmission pulses, referred to in the following as wave packets, are transmitted periodically, reflected by the surface of the fill substance and received back after a distance dependent travel time. On the basis of the received signal, an echo function is derived, which shows the received signal amplitude as a function of time. Each value of this echo function corresponds to the amplitude of an echo reflected at a certain distance from the antenna.

In the FMCW method a microwave signal, which is periodically linearly frequency modulated, for example, according to a saw tooth function, is continuously transmitted. Consequently, the frequency of the received echo signal has, compared to the instantaneous frequency of the transmission signal at the point in time of receipt, a frequency difference, which depends on the travel time of the microwave signal and its echo signal. The frequency difference between the transmission signal and the received signal can be gained by mixing both signals and evaluating the Fourier spectrum of the mixed signal. Then, from the frequency difference, the distance of the reflecting surface from the antenna can be calculated. Additionally, the amplitudes of the spectral lines of the frequency spectrum gained by Fourier transformation correspond to the echo amplitudes. This Fourier spectrum consequently represents, in this case, the echo function.

From the echo function, at least one wanted echo is determined, which corresponds to the reflection of the transmission signal off the surface of the fill substance. From travel time of the wanted echo, there directly results, in the case of a known propagation velocity of the microwaves, the distance which the microwaves travel on their way from the measuring device to the surface of the fill substance and back. On the basis of the installed height of the fill level measuring device over the container, fill level can then be directly calculated.

Today's fill level measuring devices have, as a rule, an antenna designed for a predetermined frequency or a predetermined, narrow, frequency band.

There are, however, a large number of applications, in the case of which it is advantageous to perform fill level measurements with markedly different frequencies. In order to enable this, as a rule, two separate fill level measuring devices in each case designed for a frequency or a predetermined frequency band, or at least two separate antennas in each case designed for a frequency or a predetermined frequency band, are applied. In modern industrial plants, a large number of different measurements are, as a rule, performed in the individual containers. For this, a large number of different measuring devices are applied at, on or in the respective container. For this purpose, however, only a limited number of appropriate container openings and/or mounting apparatuses are present. Accordingly, it is frequently not possible or not desirable to provide for fill level measurements two or more fill level measuring devices or two or more antennas on a single container.

SUMMARY OF THE INVENTION

An object of the invention is to provide a fill level measuring device working with microwaves according to the travel time principle, with which measurements are performable at two markedly different frequencies using a single antenna.

For this, the invention resides in a fill level measuring device working with microwaves according to the travel time principle for measuring fill level of a fill substance in a container, comprising:

a transmitting and receiving system for producing a higher frequency microwave signal and a lower frequency microwave signal of markedly lower frequencies, for simultaneous or successive transmission of such microwave signals into the container toward the fill substance, and for receiving echo signals of the microwave signals reflected in the container back to the transmitting and receiving system, and having a single antenna, which has an internally funnel shaped horn and two hollow conductor segments connected with one another and to the horn, which has, connected to the hollow conductor segment directly adjoining the horn, a coaxial conductor connection, via which the antenna is fed with the lower frequency microwave signal and the associated lower frequency echo signal is received, and which has, connected to a horn-remote end of that one of the two hollow conductor segments arranged on an end of the hollow conductor segment adjoining the horn, a hollow conductor connection, via which the antenna is fed with the higher frequency microwave signal and the associated higher frequency echo signal is received.

In a preferred embodiment the hollow conductor segment equipped with the coaxial conductor connection has a diameter which is matched to the frequencies contained in the lower frequency microwave signal, and the hollow conductor segment equipped with the hollow conductor connection has a diameter which is matched to the frequencies contained in the higher frequency microwave signal.

In a further development the coaxial conductor connection includes a coupling protruding into the hollow conductor segment, a distance between the coupling and a transition between the two hollow conductor segments along a shared longitudinal axis of the two hollow conductor segments lies in the order of magnitude of a fourth of the wavelength of a fundamental mode of the lower frequency microwave signal at its center frequency, and the coupling has a length which lies in the order of magnitude of a fourth of the wavelength of the fundamental mode of the lower frequency microwave signal at its center frequency in free space.

In a further development, a transition element is arranged between the two hollow conductor segments.

In a preferred embodiment, the transition element has a diameter, in the case of which a characteristic impedance of the transition element for a fundamental mode of the higher frequency microwave signal is equal to a square root of a product of the characteristic impedances of the two hollow conductor segments for the fundamental mode of the higher frequency microwave signal.

In an additional embodiment, the transition element has a length which lies in the order of magnitude of a fourth of the wavelength of a fundamental mode of the higher frequency microwave signal at its center frequency.

In a further development, the coaxial conductor connection includes, protruding into the hollow conductor segment, a coupling, which extends perpendicular to a polarization of a fundamental mode of the higher frequency microwave signal.

In an additional further development, the transition element is embodied as a feedthrough, especially a glass feedthrough.

In a further development, the hollow conductor segment equipped with the hollow conductor connection has a $Cut_{off}$ frequency, which is greater than the frequencies contained in the lower frequency microwave signal.

In an additional further development, the fill level measuring device includes a single microwave generator, which produces an output signal, from which the two microwave signals are produced in separate circuit modules connected after the microwave generator and fed to the antenna, and a single signal processing system,
  to which are separately fed a first measurement signal derived on the basis of the higher frequency echo signal and a second measurement signal derived on the basis of the lower frequency echo signal, and which determines fill level on the basis of the two measurement signals.

In an additional further development
each circuit module has a frequency multiplier, a transmitting/receiving separator and a mixer, each frequency multiplier is connected to the microwave generator and serves to produce the particular microwave signal from the output signal of the microwave generator by frequency multiplication by an integer, module-specific multiplication factor, each frequency multiplier is connected via the transmitting/receiving separator to the antenna and, parallel thereto, to a first input of the respective mixer, the antenna is connected via the particular transmitting and receiving separator to a second input of the respective mixer, and after each of the mixers, there is connected a filter, which serves to filter out from a mix signal produced by mixture of the microwave signals present at the first input of the respective mixer and from the echo signal present at the second input of the respective mixer a measurement signal, whose frequencies correspond to the differences of the frequencies of the respective microwave signals and the associated echo signal.

In a further development, at least one lens or reflector is applied in the beam path of the antenna.

Additionally, the invention includes a method for measuring fill level of a homogeneous fill substance in a container with fill level measuring device of the invention, wherein
  on the basis of the higher frequency and of the lower frequency echo signals, there is derived, in each case, an echo function, which shows respective echo amplitude as a function of a variable dependent on the associated signal travel time,
  for each echo function, a maximum of the particular echo function attributable to a reflection from the surface of the fill substance is determined,
  on the basis of the positions of the two maxima, it is checked whether the two maxima are attributable to a reflection from the same surface of the fill substance, and
  fill level is determined on the basis of the position of the maximum of that echo function that has the larger amplitude, if the two maxima are attributable to a reflection from the same surface of the fill substance.

The invention likewise comprises a method for measuring fill level of a fill substance tending toward layer formation in a container with a fill level measuring device of the invention, wherein
  on the basis of the higher frequency and the lower frequency echo signals, there is derived, in each case, an echo function, which shows the respective echo amplitude as a function of a variable dependent on the associated signal travel time,
  for each echo function, an absolute maximum attributable to a reflection off a surface of the fill substance is determined,
  on the basis of the positions of the two absolute maxima, it is determined whether they are attributable to a reflection of the two microwave signals off one and the same surface of the fill substance in the container, or whether the absolute maximum of the echo function derived with the higher frequency microwave signal is attributable to a reflection off a fill substance surface of an upper fill substance layer having a lower density, and the absolute maximum of the echo function derived with the lower frequency microwave signal is attributable to a reflection off a fill substance surface of a lower fill substance layer having a higher density.

The invention additionally includes a further development of the latter method, in the case of which
  fill level is determined on the basis of the position of the maximum having the larger amplitude, if, on the basis of the position of the two absolute maxima, it was determined that the two absolute maxima are attributable to a reflection of the two microwave signals off one and the same surface of the fill substance in the container, and
  the position of the fill substance surface of the upper fill substance layer is determined on the basis of the position of the absolute maximum of the echo function derived with the higher frequency microwave signal, if it was detected that the absolute maximum of the echo function derived with the higher frequency microwave signal is attributable to a reflection off a fill substance surface of the upper fill substance layer.

With fill level measuring device of the invention, it is therewith possible to perform measurements at markedly different frequencies with a fill level measuring device having only a single antenna. This is especially advantageous in applications in the case of which only a few apparatuses for securement of an antenna or of a measuring device are provided on the container.

A further advantage of the measuring device of the invention lies in the fact that, due to its modular construction, it is manufacturable in a very cost effective manner. The expensive components, such as the antenna, the microwave generator and the signal processing system are only to be provided once. The different frequencies are produced by the two circuit modules, which are comparatively quite cost effective.

BRIEF DESCRIPTION OF THE DRAWINGS

The invention and its advantages will now be presented in greater detail on the basis of the appended drawing, in which an example of an embodiment is presented; equal parts are provided in the figures with the same reference characters. The figures of the drawing show as follows.

DETAILED DISCUSSION IN CONJUNCTION WITH THE DRAWINGS

Figure 1:
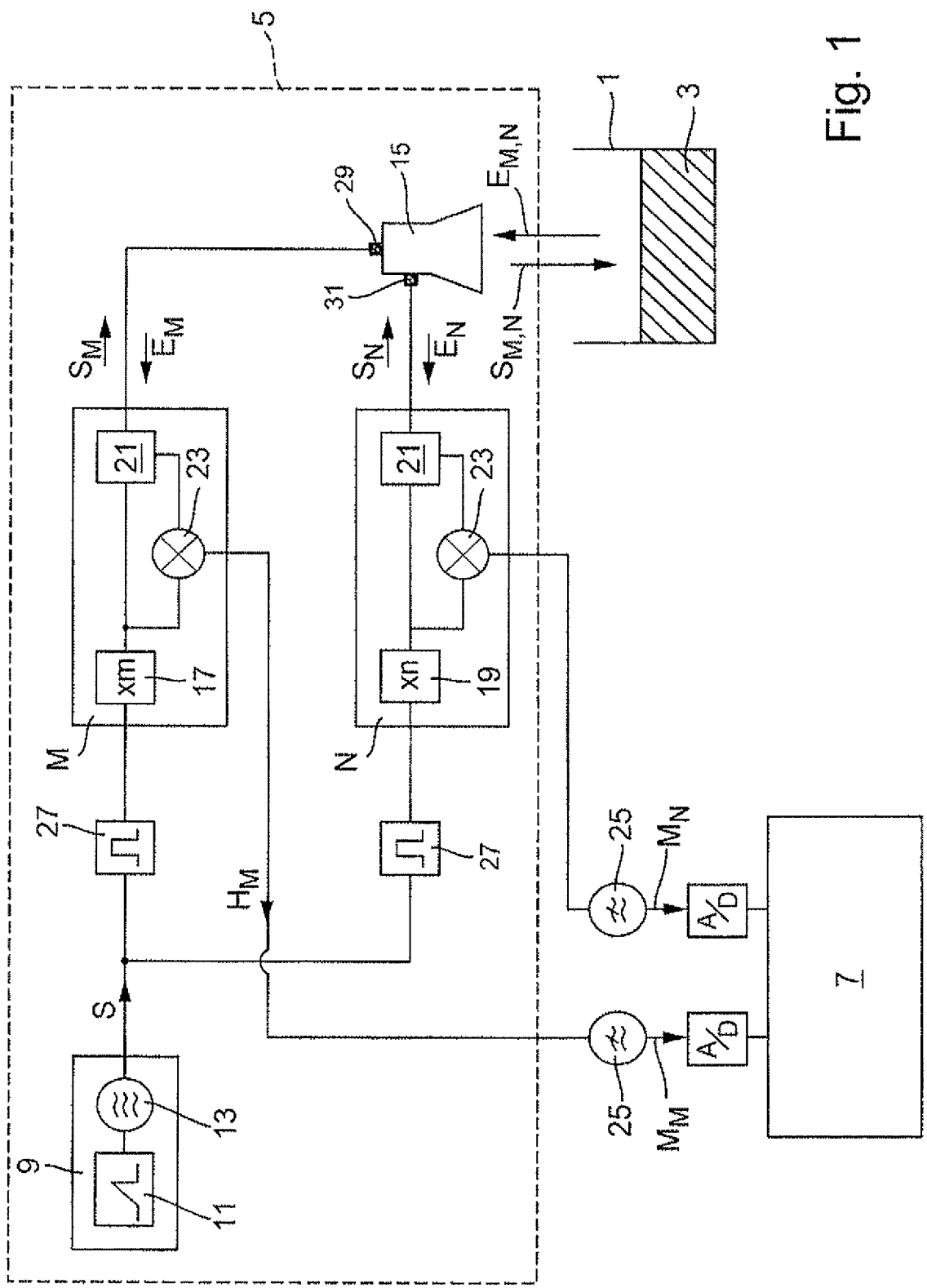
FIG. 1 is a schematic diagram of a fill level measuring device of the invention arranged on a container.

FIG. 1 shows a schematic diagram of a fill level measuring device of the invention working according to the travel time principle arranged on a container 1, above a fill substance 3 located in the container 1. The measuring device illustrated in FIG. 1 is an FMCW radar fill level measuring device. The invention is, however, also applicable in analogous manner to pulse radar fill level measuring devices.

The measuring device includes a transmitting and receiving system 5, preferably embodied in a modular manner, and a signal processing system 7 connected thereto. The transmitting and receiving system 5 serves for producing two microwave signals $S_M$, $S_N$ having markedly different frequencies $f_m$, $f_n$, for simultaneous or successive transmission of these microwave signals $S_M$, $S_N$ into the container 1 toward the fill substance 3, and for the receiving echo signals $E_M$, $E_N$ of the different microwave signals $S_M$, $S_N$ reflected in the container 1 back to the transmitting and receiving system 5.

For this, the transmitting and receiving system 5 preferably includes a single microwave generator 9, which generates an output signal S, from which the two microwave signals $S_M$, $S_N$ are produced. In the illustrated example of an embodiment of an FMCW radar fill level measuring device, generator 9 comprises an FMCW ramp generator 11 with a filter 13 connected thereafter, for delivering a periodically linear, for example, according to a sawtooth function, frequency modulated output signal S. The frequencies f of the output signal S lie in a predetermined frequency band narrowly limited above and below, and vary in time around a predetermined center frequency F of the frequency band.

In the case of a pulse radar fill level measuring device, in the place of the FMCW ramp generator 11, a pulse generator is used. The output signal S is composed, in such case, of short, periodically output, microwave pulses of predetermined frequency f.

Additionally, for each of the microwave signals $S_M$, $S_N$ the transmitting and receiving system 5 in each case includes an individual circuit module M, N, and a single antenna 15 connected to all circuit modules M, N. Each circuit module M, N in each case includes a frequency multiplier 17, 19, a transmitting/receiving separator 21 and a mixer 23. The frequency multipliers 17, 19 are, via the microwave generator 9, fed parallel to one another with the output signal S of the microwave generator 9, and multiply the frequencies f contained therein by a module-specific, integer multiplication factor m, n. They produce, in each case, a microwave signal $S_M$, $S_N$ whose frequencies are a module-specific integer multiple m, n of the frequencies of the output signal S. Each circuit module M, N has a different multiplication factor m, n. Accordingly, the individual microwave signals $S_M$, $S_N$ produced in the different modules M, N have frequencies $f_m$, $f_n$ which are markedly different from one another. The circuit module M with the frequency multiplier 17 with the higher multiplication factor m accordingly generates from the output signal S a microwave signal $S_M$ having higher frequencies $f_m$, subsequently referred to as the higher frequency microwave signal $S_M$. The circuit module N with the frequency multiplier 19 having the lower multiplication factor n generates from the output signal S a microwave signal $S_N$ having lower frequencies $f_n$, subsequently referred to as the lower frequency microwave signal $S_N$.

According to the invention, the frequencies $f_m$, $f_n$ of the different microwave signals $S_M$, $S_N$ are markedly different from one another. In the illustrated example of an embodiment with two different microwave signals $S_M$, $S_N$, the center frequency F of the higher frequency microwave signal $S_N$ lies for example, at 78 GHz, and the center frequency F of the lower frequency microwave signal $S_N$ lies at of 26 GHz. In the case of an output signal S with a center frequency F of 13 GHz, in the circuit module M, a frequency multiplier 17 with a multiplication factor of m=6, and in the circuit module N, a frequency multiplier 19 with a multiplication factor of n=2 is used for this.

The different microwave signals $S_M$, $S_N$ produced in this way are fed in parallel in the respective circuit module M, N to the respective transmitting/receiving separator 21 and a first input of the respective mixer 23. The transmitting/receiving separators 21 feed the antenna 15 with the respective microwave signal $S_M$ or $S_N$. The antenna 15 sends the microwave signals $S_M$, $S_N$ into the container 1 toward the fill substance 3, and receives their echo signals $E_M$, $E_N$ reflected back in the container 1 in the direction of the antenna 15.

The echo signals $E_M$, $E_N$ taken up by the antenna 15 are then, in turn, fed to the individual transmitting/receiving separators 21 of the circuit modules M, N, and fed by these to a second input of the respective mixer 23. The instantaneous frequency of the echo signal $E_M$ or $E_N$ present at the second input of the mixer 23 has, in comparison to the instantaneous frequency which the microwave signals $S_M$ or $S_N$ present at the first input of the mixer 23 parallel thereto has for the point in time of the receipt, a frequency difference $\Delta f_m$, $\Delta f_n$, which depends on travel time which the microwaves require for the path from the transmitting and receiving system 5 into the container 1 and back. The frequency differences $\Delta f_m$, $\Delta f_n$ between the particular microwave signal $S_M$ or $S_N$ and the associated echo signal $E_M$ or $E_N$, which are gained through mixture of the same and evaluation of the Fourier spectrum of the mixed signal $H_M$, $H_N$, thus correspond to the distance of the reflecting area from the transmitting and receiving system 5. Additionally, the amplitudes $A(\Delta f_m)$; $A(\Delta f_n)$ of the spectral lines of the frequency spectrum gained through Fourier transformation correspond to the echo amplitudes.

The mixer 23 produces through multiplication of the particular microwave signal $S_M$, $S_N$ present at its first input and the associated echo signal $E_M$ or $E_N$ present at the second input the mix signal $H_M$, $H_N$, whose frequencies correspond to the sums and the differences of the frequencies of the respective microwave signals $S_M$, $S_N$ and of the associated echo signal $E_M$ or $E_N$. Connected after the mixer 23 is, in each case, a filter 25, which filters out of the respective mix signal $H_M$, $H_N$ that part, whose frequencies correspond to the differences $\Delta f_m$, $\Delta f_n$ of the frequencies of the respective microwave signals $S_M$, $S_N$ and of the associated echo signal $E_M$ or $E_N$, and which provides this as a measurement signal $M_M$, $M_N$. The individual measurement signals $M_M$, $M_N$ are fed to their respective analog-digital transducers A/D connected after the filter 25, and the analog-digital transducers digitize the respective measurement signals $M_M$, $M_N$ and feed them in digital form to the signal processing system 7.

According to the invention, only a single signal processing system 7 is provided, to which the two measurement signals $M_M$, $M_N$ are fed separately from one another, and which evaluates the two measurement signals $M_M$, $M_N$ separately from one another. Preferably, for each measurement signal $M_M$, $M_N$, an echo function is derived, which shows the amplitude $A(\Delta f_m)$, $A(\Delta f_n)$ of the Fourier transforms of the measurement signal as a function of a variable dependent on the associated signal travel time, e.g. the frequency difference $\Delta f_m$, or $\Delta f_n$. The frequency difference $\Delta f$ corresponds to travel time, and thus to the distance of the reflecting area from the transmitting and receiving system 5. These three variables are equivalent and can be mutually converted on the basis of the frequency modulation used in the output signal S, the multiplication factors m, n, the propagation velocity of the microwaves and the installed height of the antenna 15 over the container 1. Additionally, the amplitudes correspond to the echo functions $A(\Delta f_m)$, $A(\Delta f_n)$ of the associated echo amplitudes.

The different microwave signals $S_M$, $S_N$ can be transmitted into the container 1 at the same time or offset in time from one another. For simultaneous sending of the different microwave signals $S_M$, $S_N$, the output signal S is, as described above, simultaneously fed in parallel to the individual circuit modules M, N, which generate parallel to one another the microwave signals $S_M$, $S_N$, which are then fed at the same time to the antenna 15 and transmitted by this.

The sending of the different microwave signals $S_M$, $S_N$ offset in time occurs, for example, via correspondingly operated gates inserted into the individual signal paths between the microwave generator 9 and the antenna 15. FIG. 1 shows a variant, in the case of which a gate 27 is inserted in front of each circuit module M, N. While the particular gate 27 is opened, the output signal S is present at the corresponding circuit module M, N, which generates therefrom the particular transmission signal $S_M$, $S_N$, which is then transmitted directly via the antenna 15. If the gate 27 is closed, the associated signal path is interrupted. During this time, the respective circuit module M, N does not generate a microwave signal $S_M$, $S_N$. Correspondingly, the antenna 15 at all times transmits only the microwave signals $S_M$, $S_N$ of the circuit modules M, N lying behind an opened gate 27.

Figure 2:
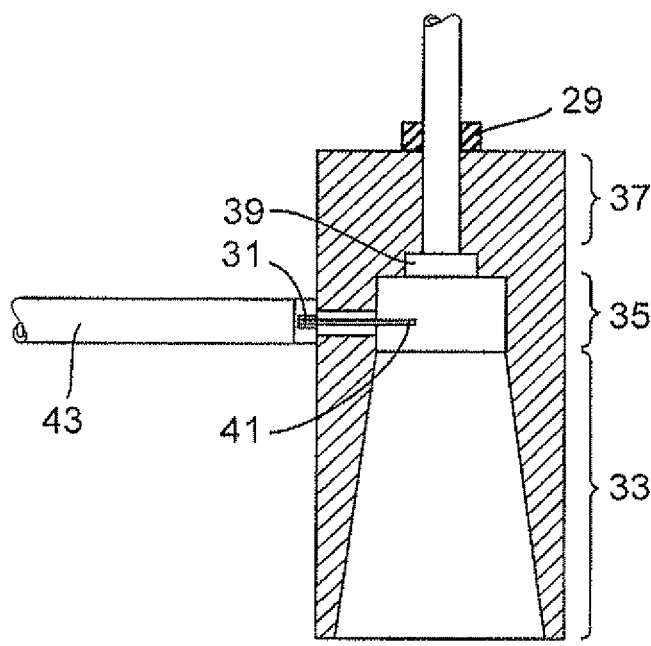
FIG. 2 illustrates the antenna of the fill level measuring device of FIG. 1.

Both microwave signals $S_M$, $S_N$ are transmitted via the antenna 15. FIG. 2 shows the antenna 15 in detail. According to the invention, the antenna 15 includes a hollow conductor connection 29 and a coaxial conductor connection 31. Via the hollow conductor connection 29, the antenna 15 is fed with the higher frequency microwave signal $S_M$, and receives the associated higher frequency echo signal $E_M$. The antenna 15 is, for this, connected via the hollow conductor connection 29 with the transmitting/receiving separator 21 of the circuit module M. Via the coaxial conductor connection 31, the antenna 15 is fed with the lower frequency microwave signal $S_N$ and receives the associated lower frequency echo signal $E_N$. The antenna 15 is, for this, connected via the coaxial conductor connection 31 with the transmitting/receiving separator 21 of the circuit module N.

The antenna 15 shown in detail in FIG. 2 is a horn antenna with an internally funnel shaped horn 33 widening in the transmission direction, and two hollow conductor segments 35, 37 connecting thereto. The hollow conductor segments 35, 37 and the horn 33 are arranged coaxially to one another along a longitudinal axis of the antenna 15, one after the other.

The hollow conductor segment 35 adjoining directly on the horn is cylindrically hollow and has an inner diameter which preferably is equal to the inner diameter of the end of the funnel shaped horn 33 adjoining thereon. The second hollow conductor segment 37 arranged on the end of this hollow conductor segment 35 which faces away from the horn 33 has, in contrast, a smaller inner diameter. Preferably, the two hollow conductor segments 35, 37 are connected with one another via a transition segment 39, whose inner diameter is greater than the inner diameter of the hollow conductor segment 37 adjoining thereon on the end facing away from the horn 33, and smaller than the hollow conductor segment 35 adjoining thereon on the end facing the horn 33. The transition element 39 serves for impedance matching at the transition between the two hollow conductor segments 35, 37 and effects thereby a reduction of the power loss occurring due to the impedance difference between the two hollow conductor segments 35, 37.

The exact dimensioning of the hollow conductor segments 35, 37 and of the transition element 39 occurs, for example, by a three-dimensional field simulation calculation. In such case, the fundamental modes H11 forming at the center frequency of the respective microwave signals $S_M$, $S_N$ are preferably used as a basis, and the transmission power of the antenna 15 is maximized for these fundamental modes H11.

For reducing the power loss, the transition element 39 preferably has a diameter, in the case of which a characteristic impedance of the transition element 39 for a fundamental mode of the higher frequency microwave signal $S_M$ is equal to a square root of a product of the characteristic impedances of the two hollow conductor segments 35, 37 for the fundamental modes of the higher frequency microwave signal $S_M$. In such case, the impedances are here also preferably determined on the basis of the fundamental modes occurring at the respective center frequency of the microwave signals $S_M$, $S_N$.

Preferably, the transition element 39 has a length which lies in the order of magnitude of a fourth of the wavelength of a fundamental mode of the higher frequency microwave signal $S_M$ at its center frequency.

Additionally, the transition element 39 can serve as a process seal, in that it is embodied as a sealed feedthrough, especially as a glass feedthrough. The hollow conductor connection 29 opens directly into the hollow conductor segment 37, which has a diameter which is matched to the frequencies $f_n$ contained in the higher frequency microwave signal $S_M$. This matching preferably also occurs here on the basis of a fundamental mode of the higher frequency microwave signal $S_M$ at their center frequency. Preferably, the hollow conductor segment 37 has a $Cut_{off}$ frequency, which is greater than the frequencies $f_n$ contained in the lower frequency microwave signal $S_N$. In this way, it is effected that the lower frequency microwave signal $S_N$ and its correspondingly likewise lower frequency echo signal $E_N$ are not capable of propagation in this hollow conductor segment 37. The hollow conductor segment 37 acts therewith as a filter, via which it is assured also in the case of the simultaneous sending of the two microwave signals $S_M$, $S_N$, that exclusively the higher frequency echo signal $E_M$ is fed via the hollow conductor connection 29 to the associated circuit module M.

The coaxial conductor connection 31 is connected to the hollow conductor segment 35 directly adjoining on the horn 33 and includes a rod-shaped coupling 41 introduced laterally into the hollow conductor segment 35, which extends perpendicularly to the longitudinal axis of the hollow conductor segment 35. Preferably, the coupling 41 is oriented in such a manner, that it extends perpendicularly to the polarization of the electrical field of the fundamental mode of the higher frequency microwave signal $S_M$ used at the center frequency of the higher frequency microwave signal $S_M$. In this way, disturbance of the propagation of the higher frequency microwave signal $S_M$ effected by the coupling 41 is minimized.

In order to effect a low-loss coupling of the lower frequency microwave signal $S_N$, the coupling 41 preferably has a length which lies in the order of magnitude of a fourth of the wavelength of the lower frequency microwave signal $S_N$ at its center frequency in free space. The installed height of the coupling 41 in the hollow conductor segment 35 is preferably selected in such a manner, that a distance between the coupling 41 and the transition between the two hollow conductor segments 35, 37 along the shared longitudinal axis of the hollow conductor segments 35, 37 is in the order of magnitude of a fourth of the wavelength of a fundamental mode of the lower frequency microwave signal $S_N$ at its center frequency. The maximum of the electromagnetic field formed in a fundamental mode is therewith located in the region of the coupling 41 and the minimum in the region of the transition between the two hollow conductor segments 35, 37.

The hollow conductor segment 35 has a diameter, which is matched to the frequencies $f_n$ contained in the lower frequency microwave signal $S_N$. Since the frequencies $f_m$ of the higher frequency microwave signal $S_M$ and its echo signal $E_M$ are a multiple of these frequencies $f_n$, both microwave signals $S_M$, $S_N$ and their echo signals $E_M$, $E_N$ are capable of propagation in this hollow conductor segment 35.

In the case of the simultaneous sending of both microwave signals $S_M$, $S_N$, the two associated echo signals $E_M$, $E_N$ can, consequently, basically be received via the coaxial conductor connection 31. In order to supply the circuit module N exclusively with the lower frequency echo signal $E_N$, a corresponding filter (not shown) can be inserted between the coaxial conductor connection 31 and the circuit module N. This is, however, not required in the case of a frequency-dependent selection of the components already present in the circuit module N, as will be apparent to those skilled in the art. If both the transmitting and receiving separator 21 as well as the associated mixer 23 are designed for the lower frequencies $f_n$, then the higher frequencies $f_m$ of the higher frequency echo signal $E_M$ undesired in this signal branch are already not capable of propagation in this signal branch, so the resulting mix signal $H_N$ and the measurement signal $M_N$ derived therefrom have no parts attributable to the higher frequency echo signal $E_M$.

Available to the signal processing system 7 are therewith two measurement signals $M_N$; $M_M$, with different frequencies $f_m$, $f_n$, recorded independently of one another, on the basis of which fill level is determined.

Figure 3:
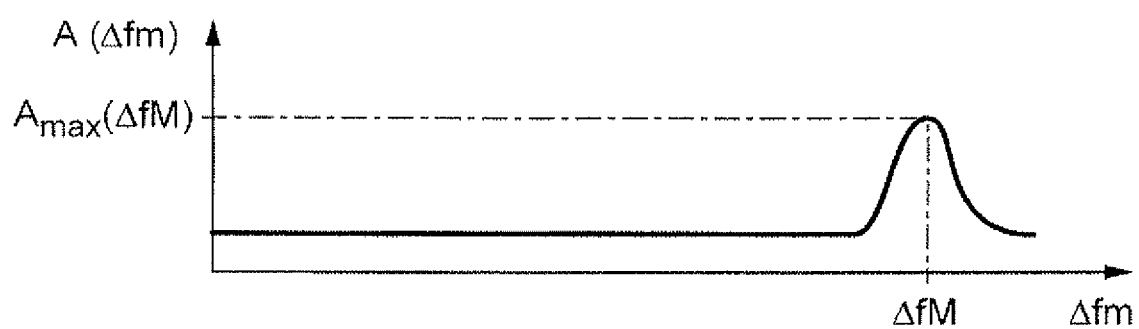
FIG. 3 illustrates the echo function derived with the higher frequency microwave signal in the measuring situation of FIG. 1.

The fill level measuring device, like all other fill level measuring devices, is suitable for classic fill level measurement of a homogeneous fill substance 3, as is presented in FIG. 1. In such case, from each of the measurement signals $M_M$, $M_N$, the associated echo functions $A(\Delta f_m)$, $A(\Delta f_n)$ are derived in the manner described above. FIG. 3 shows an example of the echo function $A(\Delta f_m)$ derived in this measuring situation with the higher frequency microwave signal $S_M$, and FIG. 4 the echo function $A(\Delta f_n)$ derived with the lower frequency microwave signal $S_N$. Under the assumption that the maximum of the particular echo function $A_{max}(\Delta f_M)$, $A_{max}(\Delta f_N)$ is attributable to a reflection of the associated microwave signal $S_M$ or $S_N$ off the surface of the fill substance, fill level is determined on the basis of the respective frequency difference $\Delta f_M$, $\Delta f_N$, in the case of which the maximum of the respective echo function $A_{max}(\Delta f_M)$, $A_{max}(\Delta f_N)$ is present. In such case, the frequency difference $\Delta f_M$, $\Delta f_N$ present at the maximum corresponds to the signal travel time to the surface of the fill substance and back, and therewith to the distance of the surface of the fill substance from the transmitting and receiving system 5, from which, on the basis of the installed height of the antenna 15, fill level is then calculated.

Since two measurement results are present here, as in the case of other redundant systems, a plausibility checking can be performed by a comparison of the two fill levels measured at the different frequencies $f_m$, $f_n$. According to the invention, on the basis of the position of the two maxima, it is checked whether the two frequency differences $\Delta f_M$, $\Delta f_N$ present at the particular maximum correspond to the same signal travel time and therewith to the same distance of the reflecting surface in the container 1 from the antenna 15. If this is the case, it then follows therefrom that the two microwave signals $S_M$, $S_N$ were reflected off the same surface of the fill substance in the container 1. The measurement hypothesis of homogeneous fill substance 3 is thereby confirmed.

The amplitude $A_{max}$ of a maximum $A_{max}(\Delta f_M)$, $A_{max}(\Delta f_N)$ of the associated echo function $A(\Delta f_m)$, $A(\Delta f_n)$ caused by the reflection off the surface of the fill substance depends decisively on the reflection coefficient of the fill substance 3. The reflection coefficient is fill substance specific and frequency dependent. The larger the reflection coefficient, the larger is the amplitude $A_{max}$ of the maximum, and the more precisely the position of the maximum, and, therewith, fill level, can be determined. If the above reviewing of the positions of the maxima yields the result that they are attributable to a reflection off one and the same surface of the fill substance, fill level is preferably determined on the basis of that maximum which has the larger amplitude; in the illustrated example, $A_{max}(\Delta f_M)$.

This method is especially advantageously applicable in situations, where unknown fill substances 3 are located in the container 1, or, for example, in the context of a production process running in the container 1, in which different fill substances 3 can be in the container 1, one after the other.

In such case, on the basis of the two echo functions $A(\Delta f_m)$, $A(\Delta f_n)$, the position of the maxima is checked; it is detected which of the two echo functions $A(\Delta f_m)$, $A(\Delta f_n)$ has the maximum with the larger amplitude $A_{max}$, attributable to the reflection off the surface of the fill substance; and fill level is determined on the basis of this echo function $A(\Delta f_m)$, $A(\Delta f_n)$. This method can be performed fully automatically via corresponding software implemented in the signal processing system 7. The fill level measuring device therewith automatically detects at which of the two frequencies $f_m$, $f_n$ the fill substance 3 instantaneously present in the container has the higher reflection coefficient. Therewith, a reliable and exact fill level measurement is possible also in the case of changing fill substances 3.

A further field of application in which fill level measuring device of the invention is especially advantageously useful is for fill substances 3 that tend toward layer formation. With "layer formation" is meant that there forms in the container 1 a lower fill substance layer 45, on which sits another fill substance layer 47 of a lesser density. This measuring situation is presented in FIG. 5.

A typical example of this is a foam layer formed on a liquid fill substance layer. Along with that, there are a large number of applications, in the case of which the fill substance 3 contains two media with different densities. Here also, that medium which has the smaller specific weight lies in an upper fill substance layer 47 on the medium with the higher specific weight. Two completely distinct layers form. The boundary between the two fill substance layers 45, 47 is referred to as the dividing layer. Dividing layers occur, for example, in the petrochemicals industry, where they are formed, for example, by water and hydrocarbons, e.g. oil. A further example is the foods industry, where dividing layers form, for example, in fat separators.

In such case, utilized is the physical fact that the frequency dependence of the transmission and reflection characteristics of materials depends on density. This dependence leads to the fact that the reflection coefficient of the upper fill substance layer 47 having the lower density is markedly smaller for the lower frequency microwave signal $S_N$ than the reflection coefficient of the same fill substance layer 45 for the higher frequency microwave signal $S_M$. Correspondingly, a significant part of the lower frequency microwave signal $S_N$ penetrates the upper fill substance layer 47 and is first reflected off the surface of the fill substance layer 45 located below.

In contrast, only a very small part of the higher frequency microwave signal $S_M$ penetrates the upper fill substance layer 47, which is then reflected off the surface of the fill substance layer 45 located below. The greater part of the higher frequency microwave signal $S_M$ is already reflected from the surface of the upper fill substance layer 47.

Figure 5:
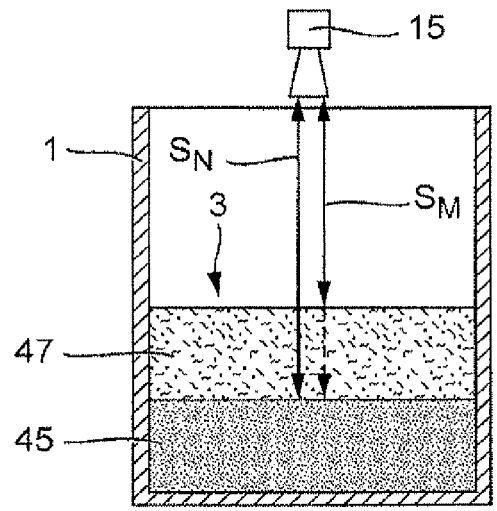
FIG. 5 illustrates an application, in the case of which the fill level measuring device of the invention is arranged on a container, in which is located a lower fill substance layer, on top of which has formed an upper fill substance layer of lesser density.
Figure 6:
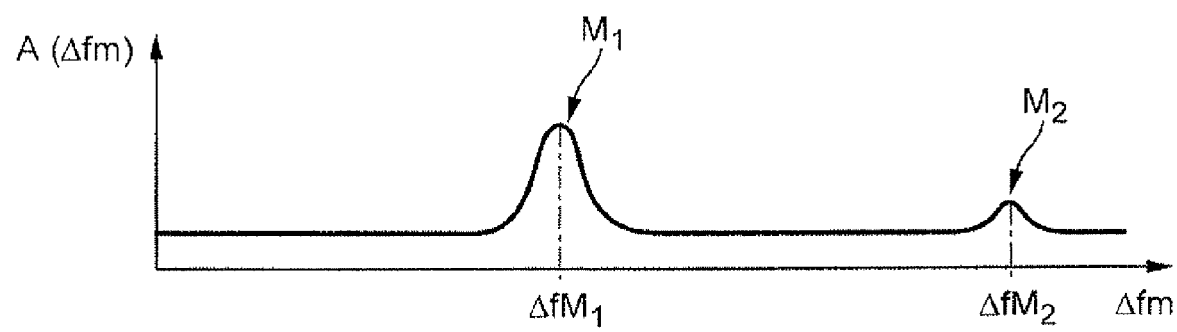
FIG. 6 illustrates an example of an echo function derived with the higher frequency microwave signal in the measuring situation presented in FIG. 5.

FIG. 6 shows an example of a measuring situation as illustrated in FIG. 5 with echo function $A(\Delta f_m)$ derived from the higher frequency microwave signal $S_M$. It includes a markedly pronounced first maximum $M_1$ attributable to the reflection off the surface of the upper fill substance layer and a subsequent, very much weaker, second maximum $M_2$, attributable to the reflection off the lower fill substance layer 45.

Figure 7:
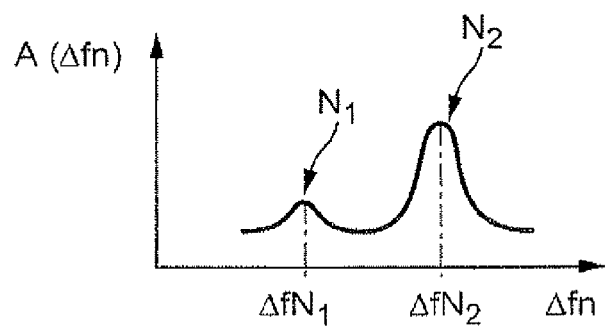
FIG. 7 illustrates an example of an echo function derived with the lower frequency microwave signal in the measuring situation presented in FIG. 5.

FIG. 7 shows an example of a measuring situation as illustrated in FIG. 5 with the echo function $A(\Delta f_n)$ derived from the lower frequency microwave signal $S_N$. It includes a weak first maximum $N_1$ attributable to the reflection off the upper fill substance layer 47, and a subsequent second maximum $N_2$, attributable to the reflection off the lower fill substance layer 45, having a markedly larger amplitude $A_{max}(\Delta f_{N2})$.

Depending on the material and density of the two fill substance layers 45, 47, in the extreme case, it can even be such that the respective weaker maximum $M_2$, $N_1$ of the two echo functions $A(\Delta f_m)$, $A(\Delta f_n)$ is no longer even recognizable.

Figure 4:
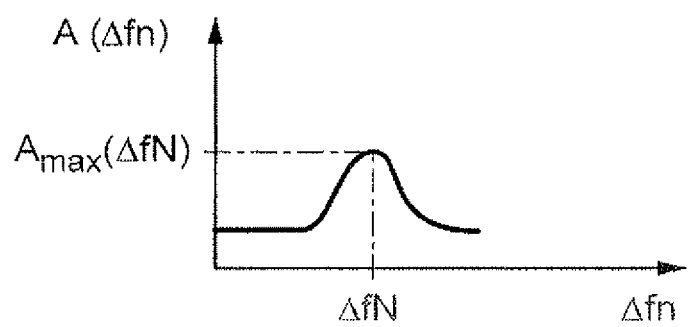
FIG. 4 illustrates the echo function derived with the lower frequency microwave signal in the measuring situation of FIG. 1

According to the invention, the absolute maximum of the two echo functions $A_{max}(\Delta f_{M1})$, $A_{max}(\Delta f_{N2})$, is preferably ascertained in each case, and the associated frequency difference $\Delta f_{M1}$, $\Delta f_{N2}$ is determined. If located in the container 1 is only a surface of the fill substance of an otherwise homogeneous fill substance 3 from which both the low frequency as well as the higher frequency microwave signal $S_M$, $S_N$ are reflected, the frequency differences of the absolute maxima of the two echo functions $A(\Delta f_m)$, $A(\Delta f_n)$ then agree up to a factor given by the ratio of the two different multiplication factors m, n. In this case, the measuring situation shown in FIGS. 1, 3 and 4 is present, and fill level of this fill substance 3 is preferably determined on the basis of the frequency difference $\Delta f_M$, $\Delta f_N$ of that maximum, which has the larger amplitude, here $A_{max}(\Delta f_M)$.

If the frequency differences $\Delta f_{M1}$, $\Delta f_{N2}$ of the absolute maxima $M_1$, $N_2$ of the two echo functions $A(\Delta f_m)$, $A(\Delta f_n)$ do not agree up to a factor given by the ratio of the two different multiplication factors m, n, the case shown in FIG. 5 is present in the container 1. As a result, the absolute maximum $M_1$ of the echo function $A(\Delta f_m)$ recorded with the higher frequency microwave signal $S_M$ corresponds to a reflection off the upper fill substance layer 47, and the absolute maximum of the echo function $A(\Delta f_n)$ recorded with the lower frequency microwave signal $S_N$ corresponds to a reflection off the lower fill substance layer 45.

In this case, on the basis of the frequency difference $\Delta f_{M1}$ of the maximum $M_1$ of the echo function $A(\Delta f_m)$ recorded with the higher frequency microwave signal $S_M$, the position of the surface of the upper fill substance layer 47 is determined. If the propagation velocity of the microwaves in the upper fill substance layer 47 is known, it is then additionally determined on the basis of the frequency difference $\Delta f_{N2}$ of the absolute maximum $N_2$ of the echo function $A(\Delta f_n)$ recorded with the low frequency microwave signal $S_N$, and on the basis of the earlier ascertained position of the surface of the upper fill substance layer 47, the position of the surface of the lower fill substance layer 45. This propagation velocity is, as a rule, known, if a fill substance 3 containing two media is located in the container 1. Here, the user knows which medium forms the upper fill substance layer 47 and can measure the associated propagation velocity beforehand or find it in the literature.

If the propagation velocity of microwaves in the upper fill substance layer 47 is not known, then, on the basis of the frequency difference $\Delta f_{N2}$ of the absolute maximum $N_2$ of the echo function $A(\Delta f_n)$ recorded with the lower frequency microwave signal $S_N$ and the earlier ascertained position of the surface of the upper fill substance layer 47, an approximate value for the position of the surface of the lower fill substance layer 45 can be determined, in that an estimated value is applied for the unknown propagation velocity. Thus, the position of the surface of the lower fill substance layer can, in the case of foam formation, for example, be determined under the assumption, that the propagation velocity of the microwaves in the upper fill substance layer 47 is approximately equal to the known propagation velocity in air.

In the previously described applications, the antenna 15 was in each case directly used as the transmitter and receiver. It is, however, of course also possible to use the antenna 15 as a component of a lens or reflector antenna.

Figure 8:
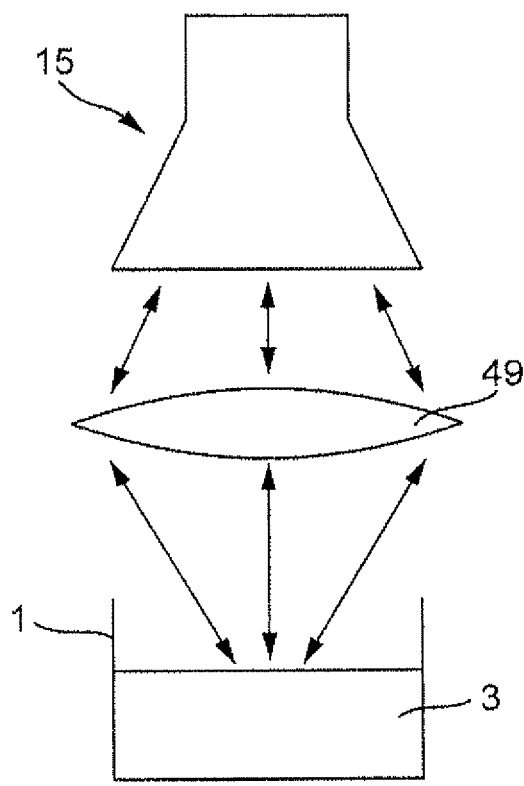
FIG. 8 illustrates a form of embodiment, in the case of which a lens is applied in the beam path of the antenna.

In the first case, in the vicinity of the antenna 15, a lens 49 is inserted in the ray path. This is shown in FIG. 8. The lens 49 can serve, for example, to set via a corresponding frequency-dependent bundling of the microwave signals $S_M$, $S_N$ incoming thereon the aperture angle with which the corresponding microwave signals $S_M$, $S_N$ are transmitted. The aperture angle, at which the microwave signals $S_M$, $S_N$ are transmitted via the antenna 15, is frequency dependent. The smaller the ratio of the aperture of the antenna 15 to the wavelength of the microwaves, the larger is the aperture angle. In the place of an individual lens 49, more complex lens systems composed of a plurality of lenses, can of course, also be applied here.

Through a corresponding lens choice, it is, for example, possible to match the individual aperture angles to one another, so that the two microwave signals $S_M$, $S_N$ are transmitted at the same aperture angle into the container 1.

Figure 9:
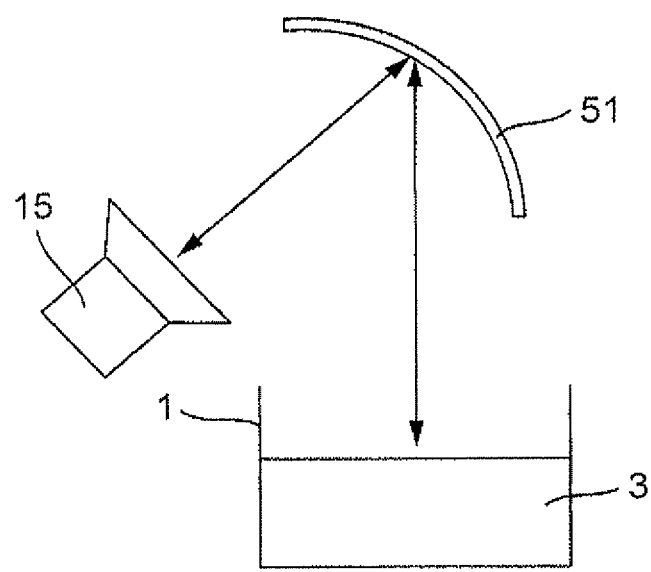
FIG. 9 illustrates a form of embodiment, in the case of which a reflector is applied in the beam path the antenna.

In the second case, applied in the beam path of the antenna 15 is a reflector 51, which directs, or steers, the microwave signals $S_M$, $S_N$ directed onto the reflector 51 and transmitted by the antenna 15, in a desired direction, and reflects their echo signals $E_M$, $E_N$ back to the antenna 15. This case is presented in FIG. 9.

The invention claimed is:

1. A fill level measuring device working with microwaves according to a travel time principle for measuring the fill level of a fill substance in a container, comprising:
    a transmitting and receiving system, for producing a higher frequency microwave signal and a lower frequency microwave signal having markedly lower frequencies, for simultaneous or successive transmission of these microwave signals into the container directed toward the fill substance, and for receiving higher frequency and the lower frequency echo signals of the microwave signals reflected in the container back to the transmitting and receiving system, to determine the fill level on the basis of the travel time of the microwave signals;
    a processing system; and;
    a single antenna, wherein:
    said transmitting and receiving system includes: an internally funnel shaped horn; two hollow conductor segments connected with one another and connected to said horn; a coaxial conductor connector connected to a first hollow conductor segment directly adjoining said horn, via which said antenna is fed with the lower frequency microwave signal and the associated lower frequency echo signal is received; and a second hollow conductor segment connected to a horn-remote end of said first hollow conductor segments arranged on an end of said second hollow conductor segment adjoining said horn, via which said antenna is fed with the higher frequency microwave signal and the associated higher frequency echo signal is received; and
    said processing system checks whether the higher frequency and lower frequency echo signals are attributable to a reflection from the same surface of the fill substance, or from the fill substance of an upper fill substance layer having a lower density, and from the fill substance of a lower fill substance layer having a higher density.

2. The fill level measuring device as claimed in claim 1, wherein:
    said first hollow conductor segments equipped with said coaxial conductor connection has a diameter which is matched to the frequencies contained in the lower frequency microwave signal; and
    the other of said hollow conductor segments equipped with said hollow conductor connection has a diameter, which is matched to the frequencies contained in the higher frequency microwave signal.

3. The fill level measuring device as claimed in claim 1, wherein:
    said coaxial conductor connection has a coupling protruding into one of said hollow conductor segments;
    a distance between said coupling and a transition between said two hollow conductor segments along a shared longitudinal axis of said two hollow conductor segments lies in order of magnitude of a fourth of the wavelength of a fundamental mode of the lower frequency microwave signal at its center frequency; and
    said coupling has a length which lies in order of magnitude of a fourth of the wavelength of a fundamental mode of the lower frequency microwave signal at its center frequency in free space.

4. The fill level measuring device as claimed in claim 1, wherein:
    a transition element is arranged between said two hollow conductor segments.

5. The fill level measuring device as claimed in claim 4, wherein:
    said transition element has a diameter, in the case of which a characteristic impedance of said transition element for the higher frequency microwave signal is equal to a square root of a product of the characteristic impedances of said two hollow conductor segments for fundamental modes of the higher frequency microwave signal.

6. The fill level measuring device as claimed in claim 4, wherein:
    said transition element has a length, which lies in order of magnitude of a fourth of the wavelength of a fundamental mode of the higher frequency microwave signal at its center frequency.

7. The fill level measuring device as claimed in claim 4, wherein:
    said transition element is embodied as a feedthrough, especially a glass feedthrough.

8. The fill level measuring device as claimed in claim 1, wherein:
    said coaxial conductor connection has a coupling protruding into said one of said hollow conductor segments and extending perpendicularly to a polarization of a fundamental mode of the higher frequency microwave signal.

9. The fill level measuring device as claimed in claim 1, wherein:
    said hollow conductor segment equipped with said hollow conductor connection has a $\text{Cut}_{\textit{off}}$ frequency, which is greater than the frequencies contained in the lower frequency microwave signal.

10. The fill level measuring device as claimed in claim 1, which:
    has a single microwave generator, which produces an output signal, from which the two microwave signals are produced in separate circuit modules connected after said microwave generator and fed to said antenna; and
    has a single signal processing system, to which:
    are separately fed a first measurement signal derived on basis of the higher frequency echo signal and a second measurement signal derived on basis of the lower frequency echo signal; and
    on the basis of the two measurement signals, determines fill level.

11. The fill level measuring device as claimed in claim 10, wherein:
    each circuit module has a frequency multiplier, a transmitting/receiving separator and a mixer;
    each said frequency multiplier is connected to said microwave generator and serves to produce from the output signal of said microwave generator by frequency multiplication by an integer, module specific, multiplication factor the respective microwave signal;
    each frequency multiplier is connected via said transmitting/receiving separator to said antenna and, in parallel thereto, to a first input of said respective mixer;

said antenna is connected via said respective transmitting and receiving separator to a second input of said respective mixer; and after each of said mixers, a filter is connected, which serves to filter out from a mix signal produced by mixing of the microwave signals present at the first input of said respective mixer and the echo signal present at the second input of said respective mixer a measurement signal, whose frequencies correspond to differences between the frequencies of the respective microwave signals and the associated echo signal.

12. The fill level measuring device as claimed in claim 1, wherein:

at least one lens or a reflector is applied in the beam path of said antenna.

13. A method for measuring the fill level of a homogeneous fill substance in a container with a fill level measuring device, the method comprising the following steps which are performed by a signal processing system of the fill level measuring device:

servicing an echo function in each case, on the basis of the higher frequency and the lower frequency echo signals which shows echo amplitude as a function of a variable dependent on signal travel time;

determining for each echo function, a maximum attributable to a reflection off the surface of the fill substance;

checking on basis of the positions of the two maxima, whether the two maxima are attributable to a reflection from the same surface of the fill substance; and determining the fill level on the basis of the position of the maximum of that echo function that has the larger amplitude, if the two maxima are attributable to a reflection from the same surface of the fill substance.

14. A method for measuring fill level of a fill substance tending toward layer formation in a container using a fill level measuring device as the method comprising the following steps which are performed by a signal processing system of the fill level measuring device:

servicing an echo function, in each case, on the basis of the higher frequency and the lower frequency echo signals, which shows the respective echo amplitude as a function of a variable dependent on the associated signal travel time;

determining an absolute maximum of each echo function attributable to a reflection off a surface of the fill substance; and determining on the basis of the position of the two absolute maxima whether they are attributable to a reflection of the two microwave signals off one and the same surface of the fill substance in the container, or whether the absolute maximum of the echo function derived with the higher frequency microwave signal is attributable to a reflection off a surface of the fill substance of an upper fill substance layer having a lower density, and the absolute maximum of the echo function derived with the lower frequency microwave signal is attributable to a reflection off a surface of the fill substance of a lower fill substance layer having a higher density.

15. The method as claimed in claim 14, wherein:

the fill level is determined on the basis of the position of the maximum having the larger amplitude, if, on the basis of the positions of the two absolute maxima, it was determined that the two absolute maxima are attributable to a reflection of the two microwave signals off one and the same surface of the fill substance in the container; and determining the position of the fill substance surface of the upper fill substance layer on the basis of the position of the absolute maximum of the echo function derived with the higher frequency microwave signal, if it was determined that the absolute maximum of the echo function derived with the higher frequency microwave signal is attributable to a reflection off a fill substance surface of the upper fill substance layer.

16. A fill level measuring device working with microwaves according to a travel time principle for measuring fill level of a fill substance in a container, comprising:

a transmitting and receiving system, for producing a higher frequency microwave signal and a lower frequency microwave signal having markedly lower frequencies, for simultaneous or successive transmission of these microwave signals into the container directed toward the fill substance, and for receiving higher frequency and the lower frequency echo signals of the microwave signals reflected in the container back to the transmitting and receiving system, to determine the fill level on the basis of the travel time of the microwave signals, a single antenna, said transmitting and receiving system including: an internally funnel shaped horn;

two hollow conductor segments connected with one another and connected to said horn;

a coaxial conductor connector connected to a first hollow conductor segment directly adjoining said horn, via which said antenna is fed with the lower frequency microwave signal and the associated lower frequency echo signal is received;

a second hollow conductor segment connected to a horn-remote end of said first hollow conductor segment arranged on an end of said second hollow conductor segment adjoining said horn, via which said antenna is fed with the higher frequency microwave signal and the associated higher frequency echo signal is received;

wherein said first hollow conductor segment has a diameter, which is matched to the frequencies contained in the lower frequency microwave signal and in the higher frequency microwave signal, which are a multiple of frequencies contained in the lower frequency microwave signal;

whereby the lower frequency microwave signal and the higher frequency microwave signal and their echo signals are capable of propagation in said first hollow conductor segment; and whereby in the case of the simultaneous sending of the lower frequency microwave signal and the higher frequency microwave signal, the two associated echo signals can consequently, be received via a coaxial conductor connection.

* * * * *